US005558396A

United States Patent [19]

Yu

[11] Patent Number: 5,558,396
[45] Date of Patent: Sep. 24, 1996

[54] BICYCLE SADDLE ASSEMBLY WITH A BICYCLE SADDLE CAPABLE OF ABSORBING SHOCK IN A PLURALITY OF DIRECTIONS.

[75] Inventor: Tsai-Yun Yu, Taichung Hsien, Taiwan

[73] Assignee: Selle Tech Industrial Co., Ltd., Taichung Hsien, Taiwan

[21] Appl. No.: 306,996

[22] Filed: Sep. 16, 1994

[51] Int. Cl.$^6$ ............................................ B62J 1/02
[52] U.S. Cl. .................. 297/208; 297/195.1; 297/197; 297/213
[58] Field of Search ........................ 297/208, 195.1, 297/213, 452.49, 197

[56] References Cited

FOREIGN PATENT DOCUMENTS

| 0028975 | 4/1925 | France | 297/208 |
|---------|--------|--------|---------|
| 0589274 | 5/1925 | France | 297/208 |
| 06251116 | 8/1927 | France | 297/208 |
| 0787513 | 9/1935 | France | 297/208 |
| 0883266 | 6/1943 | France | 297/213 |
| 0431219 | 7/1935 | United Kingdom | 297/208 |
| 0442755 | 2/1936 | United Kingdom | 297/208 |

*Primary Examiner*—Peter R. Brown
*Assistant Examiner*—Anthony D. Barfield
*Attorney, Agent, or Firm*—Beveridge, Degrandi, Weilacher & Young, LLP

[57] ABSTRACT

The bicycle saddle of a bicycle saddle assembly includes a rigid saddle body which is formed as a looped member and which has a front portion with a nose, an intermediate portion and a rear portion. The saddle body has a width which increases gradually from the nose to the rear portion and defines an opening. The saddle body has a periphery defining the opening which is formed with a plurality of spring retaining holes. The bicycle saddle further includes a rigid spring retaining plate which has a periphery formed with a plurality of spring retaining holes, and a plurality of elongated coil springs, each of which has a first end secured to one of the retaining holes in the saddle body and a second end secured to one of the retaining holes in the retaining plate. The coil springs extend radially in different directions from the retaining plate to the saddle body to enable the bicycle saddle to absorb shock in a plurality of directions when the saddle assembly is in use.

20 Claims, 5 Drawing Sheets

BICYCLE SADDLE ASSEMBLY WITH A BICYCLE SADDLE CAPABLE OF ABSORBING SHOCK IN A PLURALITY OF DIRECTIONS.

BACKGROUND OF THE INVENTION

1. Field of the Invention

The invention relates to a bicycle saddle assembly, more particularly to a bicycle saddle assembly with a bicycle saddle that is capable of absorbing shock in a plurality of directions.

2. Description of the Related Art

Referring to FIG. 1, a conventional bicycle saddle assembly is shown to comprise a bicycle saddle which includes a rigid saddle body (A), a cushion layer (B) which is made of foam or rubber and which is provided on a top side of the saddle body (A), a leather covering (C) which encloses the cushion layer (B) and which has a periphery attached to a bottom side of the saddle body (A), and a saddle support (D) connected to the bottom side of the saddle body (A) for mounting the saddle assembly to a bicycle frame.

The saddle body (A) has a front portion formed with a nose (A1), an intermediate portion (A2) and a rear portion (A3). The width of the saddle body (A) increases gradually from the nose (A1) to the rear portion (A3). The intermediate portion (A2) is formed with a generally rectangular opening (A21) that extends along the length of the saddle body (A), and a series of spring retaining holes (A22, A23) adjacent front and rear ends of the opening (A21). The bicycle saddle further includes a plurality of elongated coil springs (E), each of which has a front end secured to one of the retaining holes (A22) and a rear end secured to one of the retaining holes (A23).

The coil springs (E) serve to absorb shock which is generated when the saddle assembly is in use, thereby providing comfort to the user. However, since the coil springs (E) are oriented generally along the length of the saddle body (A), the coil springs (E) are incapable of effectively absorbing shock which is directed sideways, i.e. in a direction transverse to the lengths of the coil springs (E). Furthermore, the shock-absorbing effect of the coil springs (E) is not ideal since the coil springs (E) disperse shock only by moving back and forth relative to the front and rear ends of the opening (A21).

Moreover, when a male user is seated on the conventional saddle assembly, the crotch of the user is usually positioned on the nose (A1). Since the coil springs (E) do not extend to the nose (A1), shock at the nose (A1) may harm the male sex organ when the conventional saddle assembly is in use.

SUMMARY OF THE INVENTION

Therefore, the main object of the present invention is to provide a bicycle saddle assembly with a bicycle saddle that is capable of effectively absorbing shock in a plurality of directions.

Another object of the present invention is to provide a bicycle saddle assembly with a bicycle saddle that is capable of absorbing shock at the nose thereof to prevent injuries to the sex organ of a male user when the saddle assembly is in use.

Accordingly, the bicycle saddle assembly of the present invention comprises a bicycle saddle which has a rigid saddle body, a cushion layer which is made of a flexible material and which is provided on a top side of the saddle body, a leather covering which encloses the cushion layer and which has a periphery that is attached to a bottom side of the saddle body, and a saddle support connected to the bottom side of the saddle body.

The saddle body is formed as a looped member and has a front portion with a nose, an intermediate portion and a rear portion. The saddle body has a width which increases gradually from the nose to the rear portion and confines an opening. The saddle body has a periphery defining the opening which is formed with a plurality of spring retaining holes.

The bicycle saddle further comprises a rigid spring retaining plate which has a periphery formed with a plurality of spring retaining holes, and a plurality of elongated coil springs, each of which has a first end secured to one of the retaining holes in the saddle body and a second end secured to one of the retaining holes in the retaining plate. The coil springs extend radially in different directions from the retaining plate to the saddle body to enable the bicycle saddle to absorb shock in a plurality of directions when the saddle assembly is in use.

Preferably, the coil springs position the retaining plate at a central portion of the opening. The opening preferably extends from the nose to the rear portion of the saddle body, and some of the coil springs preferably extend substantially along a lengthwise direction of the saddle body and have their first end secured to the nose to provide the latter with shock-absorbing capabilities.

In the disclosed embodiment, the intermediate portion of the saddle body curves slightly downward with respect to the front and rear portions. The retaining plate preferably has a narrow rectangular front portion and a wide semi-circular rear portion connected to the rectangular front portion.

BRIEF DESCRIPTION OF THE DRAWINGS

Other features and advantages of the present invention will become apparent in the following detailed description of the preferred embodiment, with reference to the accompanying drawings, of which.

DETAILED DESCRIPTION OF THE PREFERRED EMBODIMENT

Figure 1:
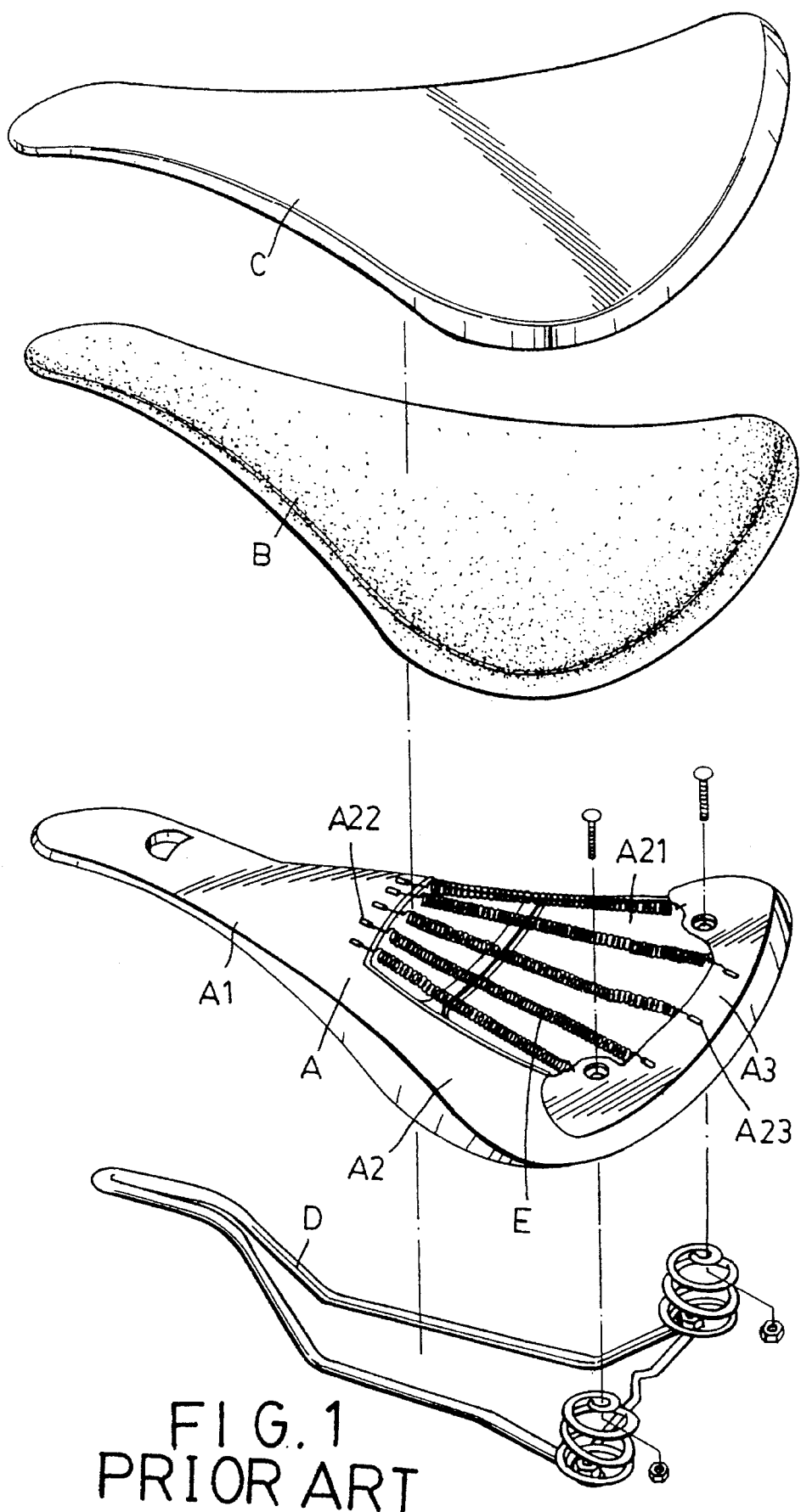
FIG. 1 is a partly exploded view of a conventional bicycle saddle assembly.
Figure 2:
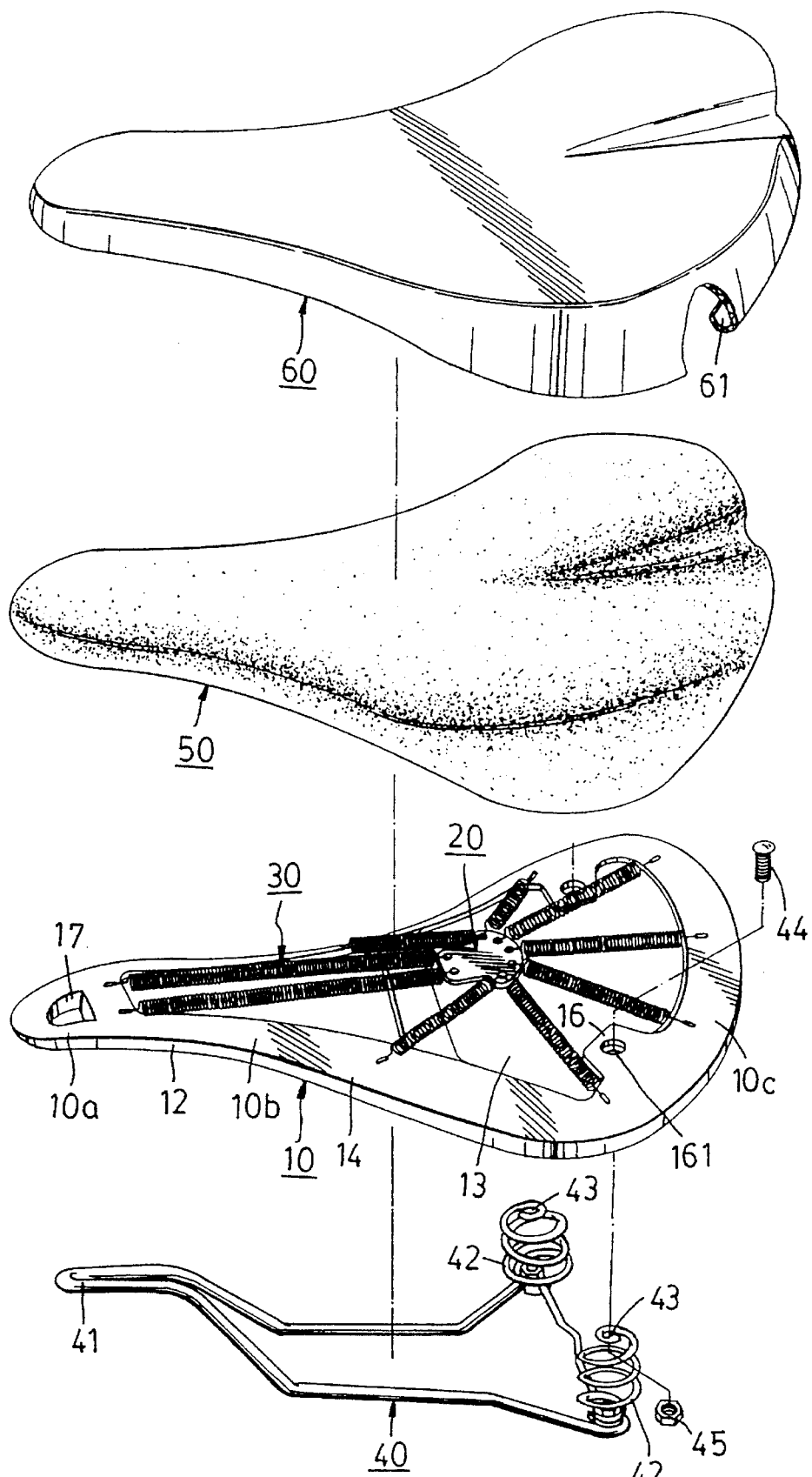
FIG. 2 is an exploded view of the preferred embodiment a bicycle saddle assembly according to the present invention.

Referring to FIG. 2, the preferred embodiment of a bicycle saddle assembly according to the present invention is shown to comprise a bicycle saddle which includes a rigid saddle body 10, a cushion layer 50 which is made of a flexible material, such as foam, and which is attached to a top side of the saddle body 10 by means of adhesives, a leather covering 60 which encloses the cushion layer 50 and which has a periphery 61 that is attached to a bottom side of the saddle body 10, and a saddle support 40 connected to the bottom side of the saddle body 10 for mounting the saddle assembly to a bicycle frame.

Figure 3:
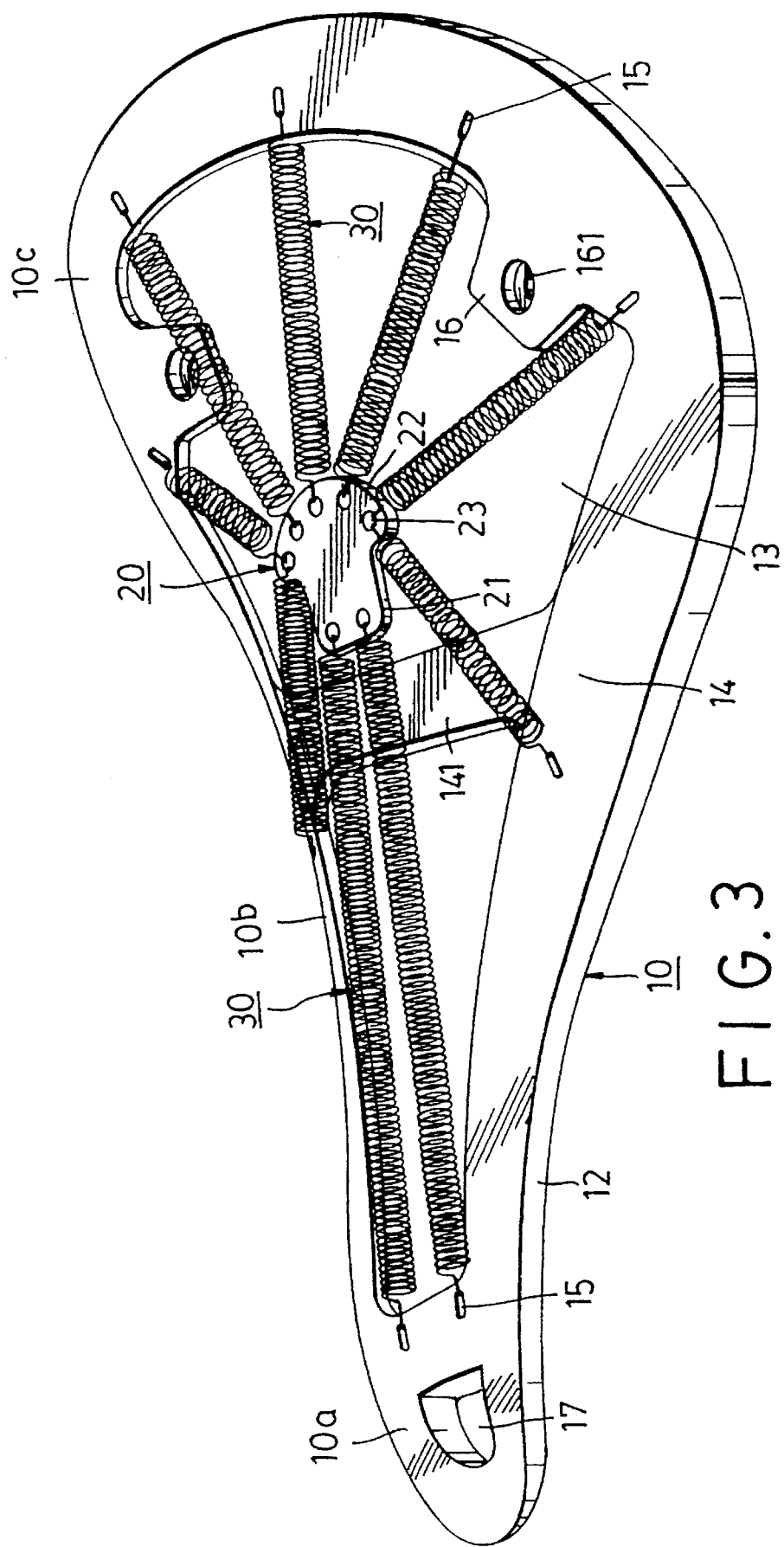
FIG. 3 is a perspective view of a bicycle saddle of the preferred embodiment.
Figure 4:
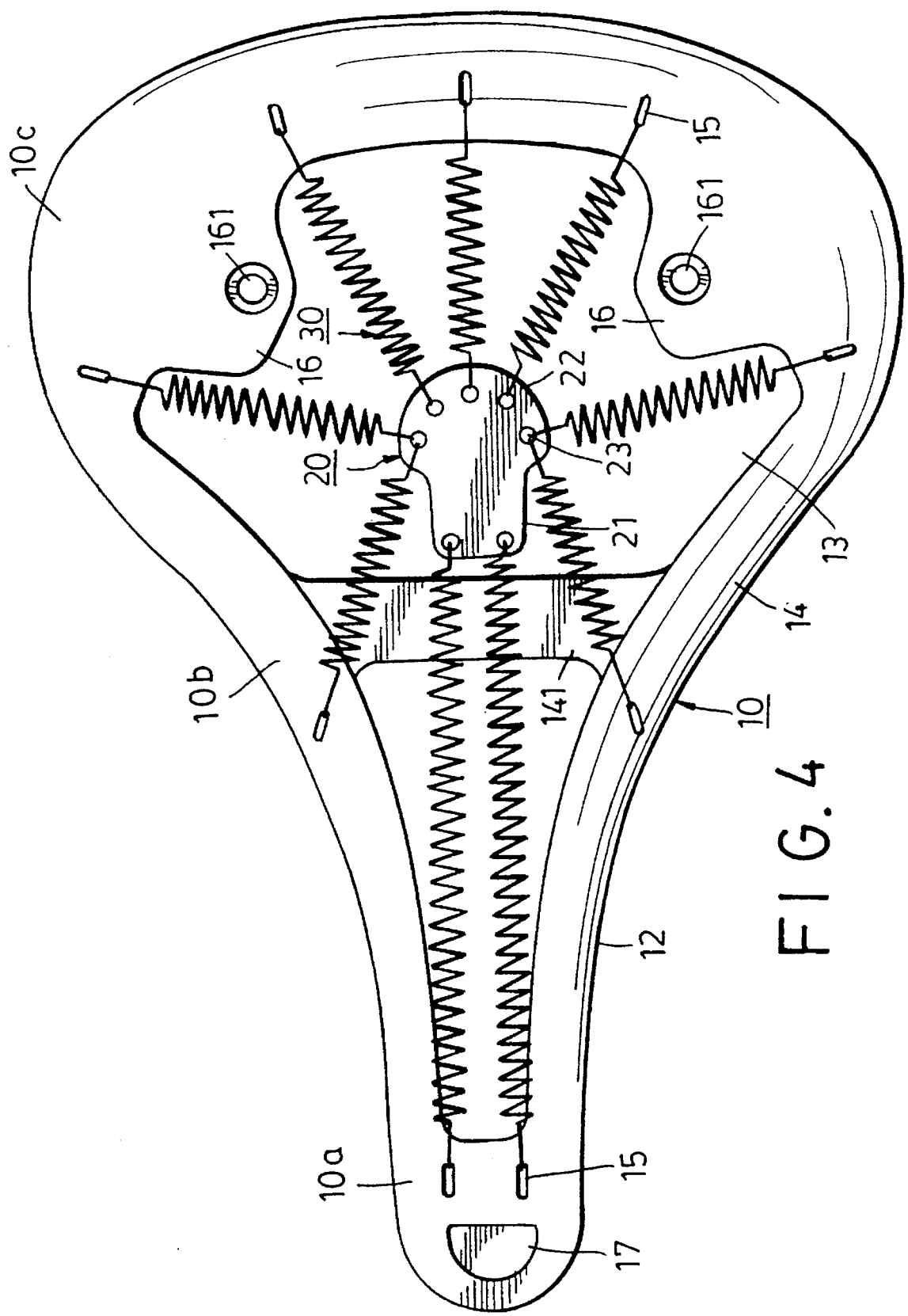
FIG. 4 is a top view of the bicycle saddle shown in FIG. 3.

Referring to FIGS. 3 and 4, the saddle body 10, which is preferably made of a rigid plastic material, is formed as a looped member and has a front portion (10a) with a nose 12, an intermediate portion (10b) and a rear portion (10c). The intermediate portion (10b) is formed as a pair of branches 14 that interconnect the nose 12 and two ends of the rear portion (10c). A reinforcing bridge 141 extends integrally across the branches 14. The saddle body 10 has a width which increases gradually from the nose 12 to the rear portion (10c) and defines an opening 13 that extends from the nose 12 to the rear portion (10c). The saddle body 10 has a periphery defining the opening 13 which is formed with a plurality of spring retaining holes 15 therealong. In this embodiment, there are nine retaining holes 15. A pair of retaining holes 15 is formed in each of the branches 14. A pair of retaining holes 15 is formed in the nose 12 adjacent to a front end of the opening 13. The remaining retaining holes 15 are formed in the rear portion (10c) of the saddle body 10. The saddle body 10 is further formed with a pair of mounting flanges 16 which extend from two ends of the rear portion (10c) into the opening 13. Each of the mounting flanges 16 is formed with a counterbore 161. The nose 12 further has a tip which is formed with an engaging hole 17.

Figure 5:
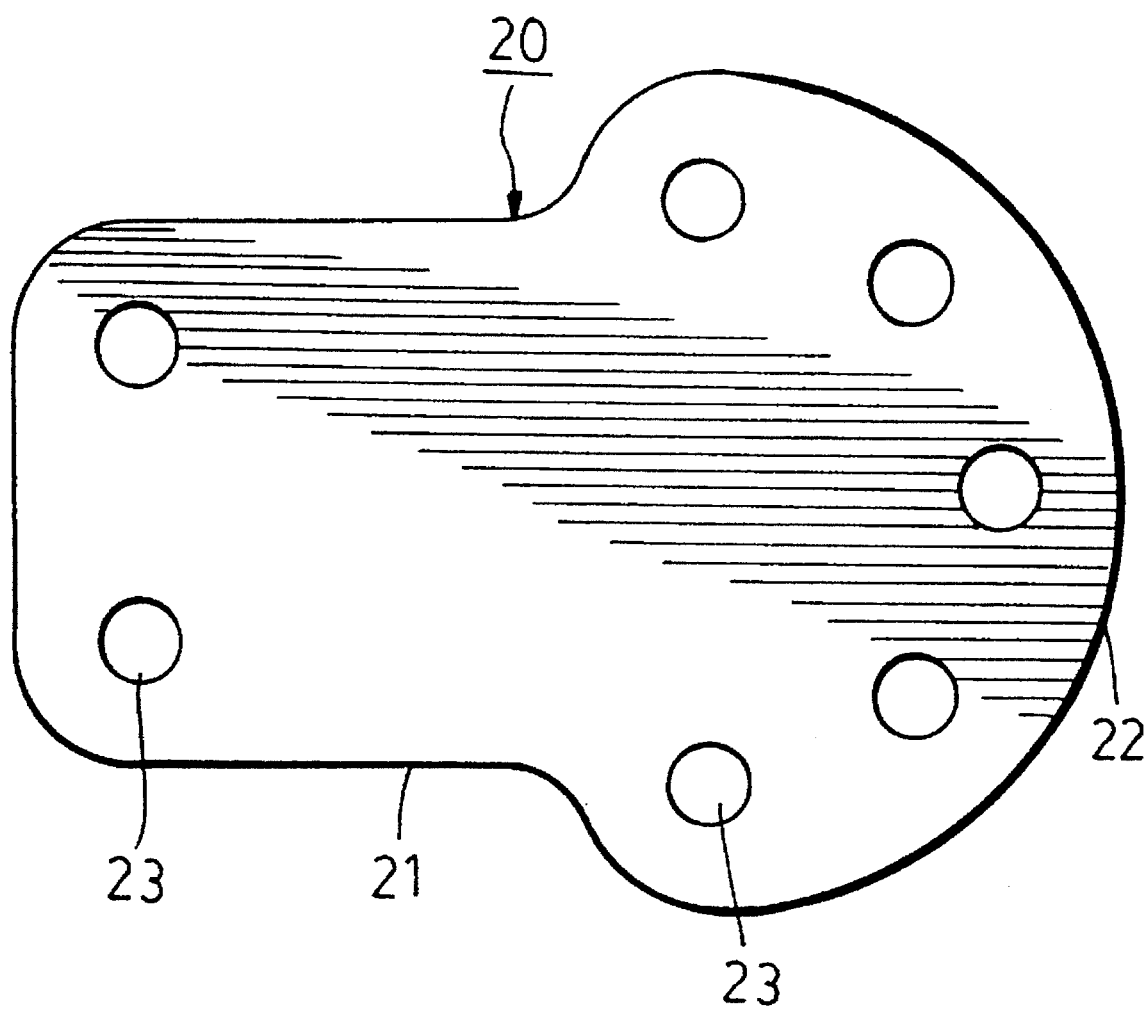
FIG. 5 is a top view of a spring retaining plate of the bicycle saddle shown in FIG. 3.

The bicycle saddle further comprises a spring retaining plate 20 and a plurality of elongated coil springs 30. As shown in Figs. 2 and 4, the spring retaining plate 20 is located between the rear portion 10c of the saddle body 10 and the reinforcing bridge 141. Referring to FIG. 5, the retaining plate 20, which is preferably made of a rigid plastic material, has a narrow rectangular front portion 21 and a wide semi-circular rear portion 22 connected to the rectangular front portion 21. The retaining plate 20 has a periphery formed with a plurality of spring retaining holes 23. FIGS. 2–5 show that the spring retaining holes 23 are located on a common plane of the retaining plate 20. In this embodiment, the retaining plate 20 is formed with seven retaining holes 23. Two of the retaining holes are formed in the rectangular front portion 21, while the remaining retaining holes 23 are formed in the semi-circular rear portion 22.

Referring once more to FIGS. 3 and 4, each of nine coil springs 30 has a first end secured to one of the retaining holes 15 in the saddle body 10 and a second end secured to one of the retaining holes 23 of the retaining plate 20. When assembled, the coil springs 30 appear to radiate from the periphery of the retaining plate 20 in different directions toward the saddle body 10 and serve to position the retaining plate 20 at a central portion of the opening 13.

In this embodiment, there are two coil springs 30 which have their first end secured to the nose 12 and which provide the nose 12 with shock-absorbing capabilities. The two coil springs 30 preferably extend along a lengthwise direction of the saddle body 10. Preferably, the intermediate portion (10b) curves slightly downwardly with respect to the front and rear portions (10a, 10c). Thus, when the coil springs 30 are assembled, the retaining plate 20 is suspended at the central portion of the opening 30.

Referring once more to FIG. 2, the saddle support 40 has a front end 41 which extends into the engaging hole 17 within the nose 12. The rear end of the saddle support 40 has a pair of upright coil springs 42 mounted thereon. Each of the upright coil springs 42 has a looped end 43 which extends into a bottom portion of the counterbore 161 of a respective one of the mounting flanges 16. A pair of screws 44 extend respectively through the counterbores 161 and engage a respective nut 45. Because of the unique arrangement of the coil springs 30, the coil springs 30 are capable of effectively absorbing shock which is directed in any direction. Furthermore, the shock-absorbing effect of the coil springs 30 is better than that of the conventional bicycle saddle assembly since the coil springs 30 are capable of transmitting shock to different parts of the saddle body 10. In addition, since some of the coil springs 30 extend to the nose 12, shock at the nose 12 can be absorbed to prevent injuries to the sex organ of a male user when the saddle assembly of this invention is in use.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A bicycle saddle assembly including a bicycle saddle which has a rigid saddle body, a cushion layer which is made of a flexible material and which is provided on a top side of said saddle body, a leather covering which encloses said cushion layer and which has a periphery that is attached to a bottom side of said saddle body, and a saddle support connected to said bottom side of said saddle body, wherein the improvement comprises:

said saddle body is formed as a looped member and has a front portion with a nose, an intermediate portion defining a pair of diverging branches, and a generally arcuate rear portion having a first end and a second end spaced apart from each other, said saddle body having a width which increases from said nose to said rear portion where the branches are connected to the first end and second end which separate the diverging branches at the rear portion of the saddle body, and the branches connect the rear portion and the front portion together, said saddle body having a periphery defining an opening, and said saddle body further defining a plurality of first spring retaining holes, each branch including one of said spring retaining holes disposed medially on each of said branches and located forwardly of a rigid spring retaining plate, between the front portion and rear portion of the saddle body; and said rigid spring retaining plate has a periphery that defines a plurality of second spring retaining holes, wherein the bicycle saddle further includes a plurality of elongated coil springs, each of which having a first end secured to one of said first spring retaining holes in said saddle body and a second end secured to one of said second spring retaining holes in said retaining plate, said coil springs extending radially in different directions from said retaining plate to said front portion, said intermediate portion and said rear portion of said saddle body, so as to enable said bicycle saddle to absorb shock in a plurality of directions when said saddle assembly is in use.

2. The bicycle saddle assembly as claimed in claim 1, wherein said coil springs position said retaining plate at a central portion of said opening.

3. The bicycle saddle assembly as claimed in claim 2, wherein said opening extends from said nose to said rear portion, some of said coil springs having said first end secured to said nose of said saddle body and providing said nose with shock absorbing capabilities.

4. The bicycle saddle assembly as claimed in claim 3, wherein said some of said coil springs extend substantially along a lengthwise direction of said saddle body.

5. The bicycle saddle assembly as claimed in claim 4, wherein said intermediate portion of said saddle body curves slightly downward with respect to said front and rear portions.

6. The bicycle saddle assembly as claimed in claim 1, wherein said retaining plate has a narrow rectangular front portion and a wide semi-circular rear portion connected to said rectangular front portion.

7. The bicycle saddle assembly as claimed in claim 1, wherein the intermediate portion of the saddle body includes a reinforcing bridge which extends between said diverging branches.

8. The bicycle saddle assembly as claimed in claim 7, wherein the spring retaining plate is located between the rear portion of the saddle body and the reinforcing bridge.

9. The bicycle saddle assembly as claimed in claim 7, wherein the second spring retaining holes are located on a common plane.

10. The bicycle saddle assembly as claimed in claim 1, wherein the second spring retaining holes are located on a common plane.

11. A bicycle saddle, comprising:

a rigid saddle body formed as a looped member and having a front portion with a nose, an intermediate portion defining a pair of diverging branches, and an arcuate rear portion having a first end and a second end spaced apart from each other, said saddle body having a width which increases from said nose to said rear portion where the branches connect the front portion with the first and second ends of the rear portion, said saddle body having a periphery defining an opening, wherein the saddle body further defines a plurality of first spring retaining holes one of said spring retaining holes being formed medially in each of said branches medially on each of said branches and located forwardly of a rigid spring retaining plate, between the front portion and rear portion of the saddle body;

said rigid spring retaining plate has a periphery which defines a plurality of second spring retaining holes; and a plurality of elongated coil springs, each of which having a first end secured to one of said first spring retaining holes in said saddle body and a second end secured to one of said second spring retaining holes in said retaining plate, said coil springs extending radially in different directions from said retaining plate to said front portion, said intermediate portion and said rear portion of said saddle body, so as to enable said bicycle saddle to absorb shock in a plurality of directions.

12. The bicycle saddle as claimed in claim 11, wherein said coil springs position said retaining plate at a central portion of said opening.

13. The bicycle saddle as claimed in claim 12, wherein said opening extends from said nose to said rear portion, some of said coil springs having said first end secured to said nose of said saddle body and providing said nose with shock absorbing capabilities.

14. The bicycle saddle as claimed in claim 13, wherein said some of said coil springs extend substantially along a lengthwise direction of said saddle body.

15. The bicycle saddle as claimed in claim 14, wherein said intermediate portion of said saddle body curves slightly downwardly with respect to said front and rear portions.

16. The bicycle saddle as claimed in claim 11, wherein said retaining plate has a narrow rectangular front portion and a wide semi-circular rear portion connected to said rectangular front portion.

17. The bicycle saddle as claimed in claim 11, wherein the intermediate portion of the saddle body includes a reinforcing bridge which extends between said diverging branches.

18. The bicycle saddle as claimed in claim 17, wherein the spring retaining plate is located between the rear portion of the saddle body and the reinforcing bridge.

19. The bicycle saddle as claimed in claim 17, wherein the second spring retaining holes are located on a common plane.

20. The bicycle saddle as claimed in claim 10, wherein the second spring retaining holes are located on a common plane.

* * * * *